(12) United States Patent
Greene

(10) Patent No.: US 8,190,744 B2
(45) Date of Patent: May 29, 2012

(54) DATA CENTER BATCH JOB QUALITY OF SERVICE CONTROL

(75) Inventor: Daniel H. Greene, Sunnyvale, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 429 days.

(21) Appl. No.: 12/474,194

(22) Filed: May 28, 2009

(65) Prior Publication Data

US 2010/0306776 A1     Dec. 2, 2010

(51) Int. Cl.
    *G06F 15/173* (2006.01)
(52) U.S. Cl. ......... 709/226; 709/223; 709/224; 709/225
(58) Field of Classification Search ........... 709/223–226
    See application file for complete search history.

(56) References Cited

U.S. PATENT DOCUMENTS

| | | | | |
|---|---|---|---|---|
| 6,205,150 | B1* | 3/2001 | Ruszczyk | 370/412 |
| 7,356,770 | B1* | 4/2008 | Jackson | 715/736 |
| 7,925,757 | B1* | 4/2011 | Rolia et al. | 709/226 |
| 2005/0021349 | A1* | 1/2005 | Cheliotis et al. | 705/1 |
| 2005/0058149 | A1* | 3/2005 | Howe | 370/428 |
| 2006/0288251 | A1* | 12/2006 | Jackson | 714/19 |
| 2007/0234363 | A1* | 10/2007 | Ferrandiz | 718/101 |
| 2007/0260669 | A1* | 11/2007 | Neiman et al. | 709/201 |
| 2007/0297415 | A1* | 12/2007 | Lee et al. | 370/395.4 |
| 2008/0052718 | A1* | 2/2008 | Hundscheidt | 718/104 |
| 2008/0168452 | A1* | 7/2008 | Molaro et al. | 718/103 |
| 2008/0192632 | A1* | 8/2008 | Bader | 370/230.1 |
| 2008/0215409 | A1* | 9/2008 | Van Matre | 705/8 |
| 2008/0295029 | A1* | 11/2008 | Dettinger et al. | 715/810 |
| 2009/0007123 | A1* | 1/2009 | Sreedharan et al. | 718/103 |
| 2009/0245213 | A1* | 10/2009 | Zaki et al. | 370/336 |
| 2009/0280849 | A1* | 11/2009 | Rosen et al. | 455/518 |
| 2010/0034185 | A1* | 2/2010 | De Bruin et al. | 370/342 |
| 2010/0131957 | A1* | 5/2010 | Kami | 718/104 |
| 2010/0260153 | A1* | 10/2010 | Hollick et al. | 370/336 |
| 2010/0299433 | A1* | 11/2010 | De Boer et al. | 709/224 |
| 2011/0125698 | A1* | 5/2011 | Rome et al. | 706/50 |

* cited by examiner

*Primary Examiner* — Hieu Hoang
(74) *Attorney, Agent, or Firm* — Marger Johnson & McCollom, P.C.

(57) ABSTRACT

A machine-controlled method can include determining an extended interval quality of service (QoS) specification for a batch job and determining a remaining data center resource requirement for the batch job based on the extended interval QoS specification. The machine-controlled method can also include determining an immediate QoS specification for the batch job based on the remaining data center resource requirement.

11 Claims, 5 Drawing Sheets

DATA CENTER BATCH JOB QUALITY OF SERVICE CONTROL

TECHNICAL FIELD

The disclosed technology relates to the field of data centers and, more particularly, to various techniques pertaining to determining data center resource allocations for batch jobs that can be implemented in connection with data center operations.

BACKGROUND

Data centers are frequently used by various types of entities for a wide variety of purposes. Service providers such as phone companies, cable networks, power companies, retailers, etc., commonly store and access their customers' data in 'server farms,' or data centers. For purposes of the present specification, 'data center' refers to a facility used to house computer systems and associated components, such as telecommunications and storage systems. A data center generally includes not only the computer systems, but also back-up power supplies, redundant data communications connections, environmental controls such as air conditioning and fire suppression, security systems and devices, etc.

Data center operations generally revolve around customer service levels. For example, a particular customer may desire to have a defined quality of service for that customer's computations or data communications. The quality of service may have different requirements for different customers. For example, for one customer, the key measure of the quality of service may involve how fast an application responds when accessed remotely. For another customer, the quality of service may involve the speed or bandwidth of connections provided to that customer's subscriber.

A data center may commit to provide a particular service level for a given customer in the form of a formally negotiated service level agreement (SLA). An SLA typically specifies levels of availability, serviceability, performance, operation, billing, etc., and may even specify penalties in the event of violations of the SLA. SLAs commonly address performance measurement, problem management, customer duties, warranties, disaster recovery, and termination of agreement. For example, an SLA may demand that a particular job get a certain amount of resources with a specified probability. The SLA may also specify a limit on the amount of resources to be assigned to a certain job or group of jobs.

'Virtualization' generally refers to a technique for hiding physical characteristics of computing resources from the way in which other systems, applications, or end users interact with those resources. This typically includes making a single physical resource such as a server, operating system, application, storage device, etc. appear to function as multiple logical resources. Virtualization may also include making multiple physical resources appear as a single logical resource. In addition, it may include making one physical resource appear, with somewhat different characteristics, as one logical resource.

Virtualization can essentially let one computer do the job of multiple computers, by sharing the resources of a single computer or cluster of computers across multiple environments. Virtual machines such as virtual servers and virtual desktops, for example, can provide users with the ability to host multiple operating systems and multiple applications both locally and in remote locations, freeing users from physical and geographical limitations. In addition to energy savings and lower capital expenses due to more efficient use of hardware resources, users can get a high availability of resources, better desktop management, increased security, and improved disaster recovery processes.

Virtual machines serve a wide variety of purposes in a given computer system. For example, virtual machines may be used to provide multiple users with simultaneous access to the computer system. Each user may execute applications in a different virtual machine, and the virtual machines may be scheduled for execution on the computer system hardware. Virtual machines may be used to consolidate tasks that were previously running on separate computer systems, for example, by assigning each task to a virtual machine and running the virtual machines on fewer computer systems. Virtual machines may also be used to provide increased availability. If the computer system fails, for example, tasks that were executing in virtual machines on the computer system may be transferred to similar virtual machines on another computer system.

Using virtual servers enables the migration of processing tasks to other physical servers or resources transparently to the consumers of the services provided by the virtual server, where the consumer may be a user, a process, another computer, etc. A 'consumer' is typically any entity that uses a process or service within the power control system. This is contrasted with a 'customer' which is an identified entity to which the data center provides services according to a service level agreement. Performance levels are generally tracked by customers.

A virtual server differs greatly from a physical server. A virtual server typically appears to be a single server to entities accessing it, while it may actually be a partition or subset of a physical server. It may also appear as a single server but actually be comprised of several physical servers. A virtual server is created through a virtualization process, as discussed above.

Thus, in a given data center, virtualization allows multiple virtual machines such as virtual servers to share physical resources such as CPU, memory, disk, networking resources, etc. of the same physical machine(s) in the data center. Each virtual machine typically has a corresponding specification of resource requirements that determines how much of the physical resources should be reserved for the given virtual machine.

DETAILED DESCRIPTION

Figure 1:
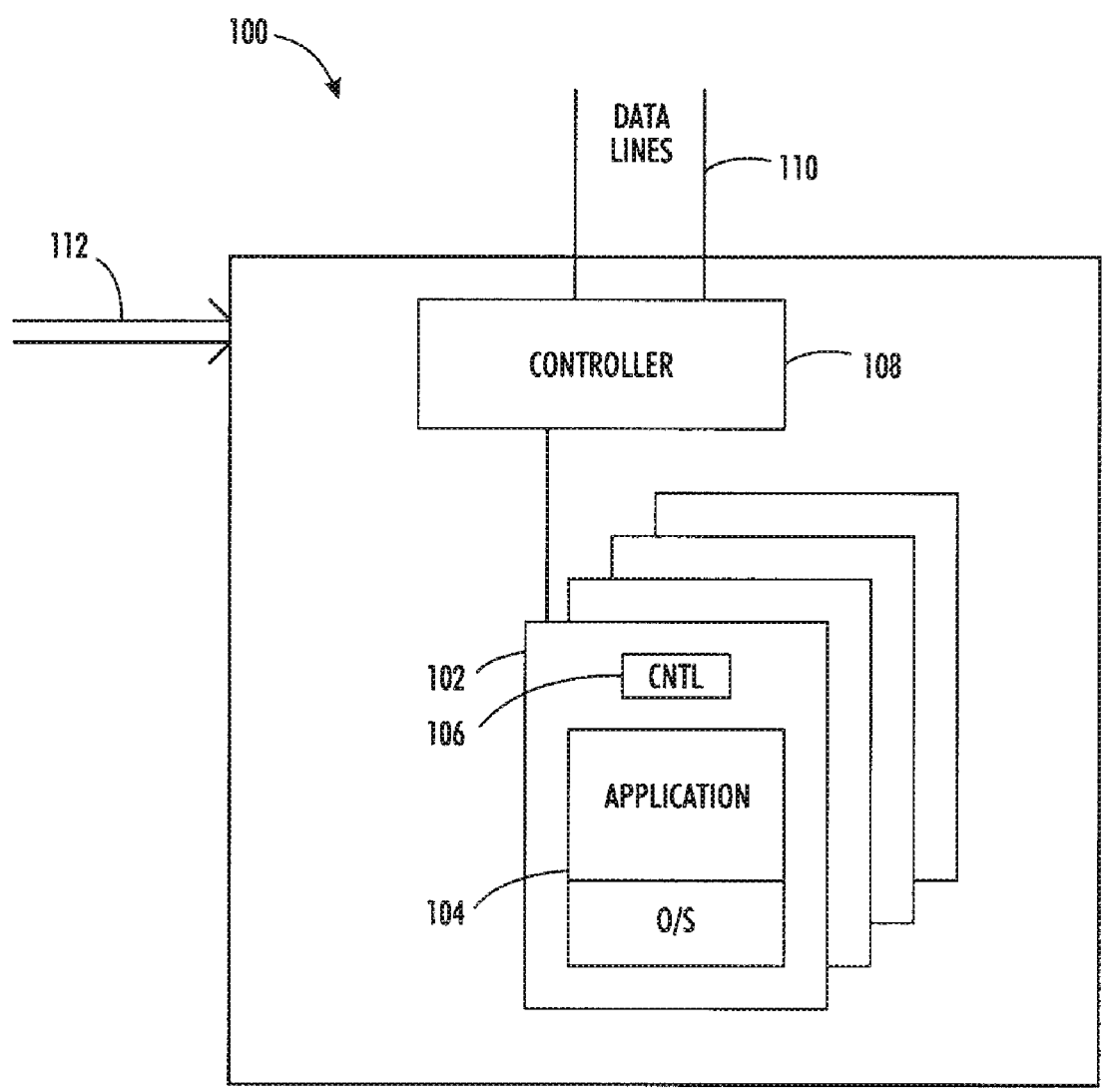
FIG. 1 illustrates an example of a data center architecture having a controller and multiple physical devices, each having a virtual machine, in accordance with embodiments of the disclosed technology.

FIG. 1 illustrates an example of a data center architecture 100 in accordance with embodiments of the disclosed technology. In the example, the data center architecture 100 includes multiple physical devices 102 such as servers. Each physical device 102 is an actual machine, such as a quad-, dual- or single-core computing system, that is able to provide a particular service. Examples of such physical devices 102 commonly include communications servers, database servers, applications servers, etc. Each physical device 102 is depicted as having at least one virtual machine 104 such as a virtual server operating on it. In the example, the virtual machine 104 includes an application running on top of an operating system.

In the example, the virtual machine 104 allows a low-level module 108 such as a service/power controller to task the physical devices 102 with processing tasks in virtual machines based in part on the resource needs of the virtual machines and the resource of the physical devices 102. The low-level module 108 may be referred to as a controller or scheduler. The controller 108 can schedule the processing of virtual machines, or the controller 108 can schedule individual tasks to be performed within virtual machines. As used herein, the term "job" generally refers to the virtual machine or task being scheduled.

In the example, the controller 108 is shown as being a single controller, though one having ordinary skill in the art will recognize that the controller 108 may actually be distributed across several computers, processing cores, etc. The controller 108 can migrate jobs between the physical devices 102 and adjust the power consumption of the physical devices 102. In addition to the central controller 108, one or more of the individual physical devices 102 may have a local controller 106. While the physical devices 102 illustrated in the example are servers, other types of devices may be included, such as power supplies, storage arrays or other types of storage, tape decks, etc.

The centralized controller 108 may be coupled to data lines 110. The functions of the data center generally revolve around data processing of some sort, and the controller may merely exist in the same power distribution structure as the data lines, or the power controller may monitor or affect the operation of the data lines. Similarly, the power controller may merely exist in the same power structure as the power lines 112, or the controller 108 may take a more active role with the power lines 112. The power lines 112 come in from the local power infrastructure, which is also referred to as "the grid" and generally includes transmission lines, converters, transformers, and power switches.

Figure 2:
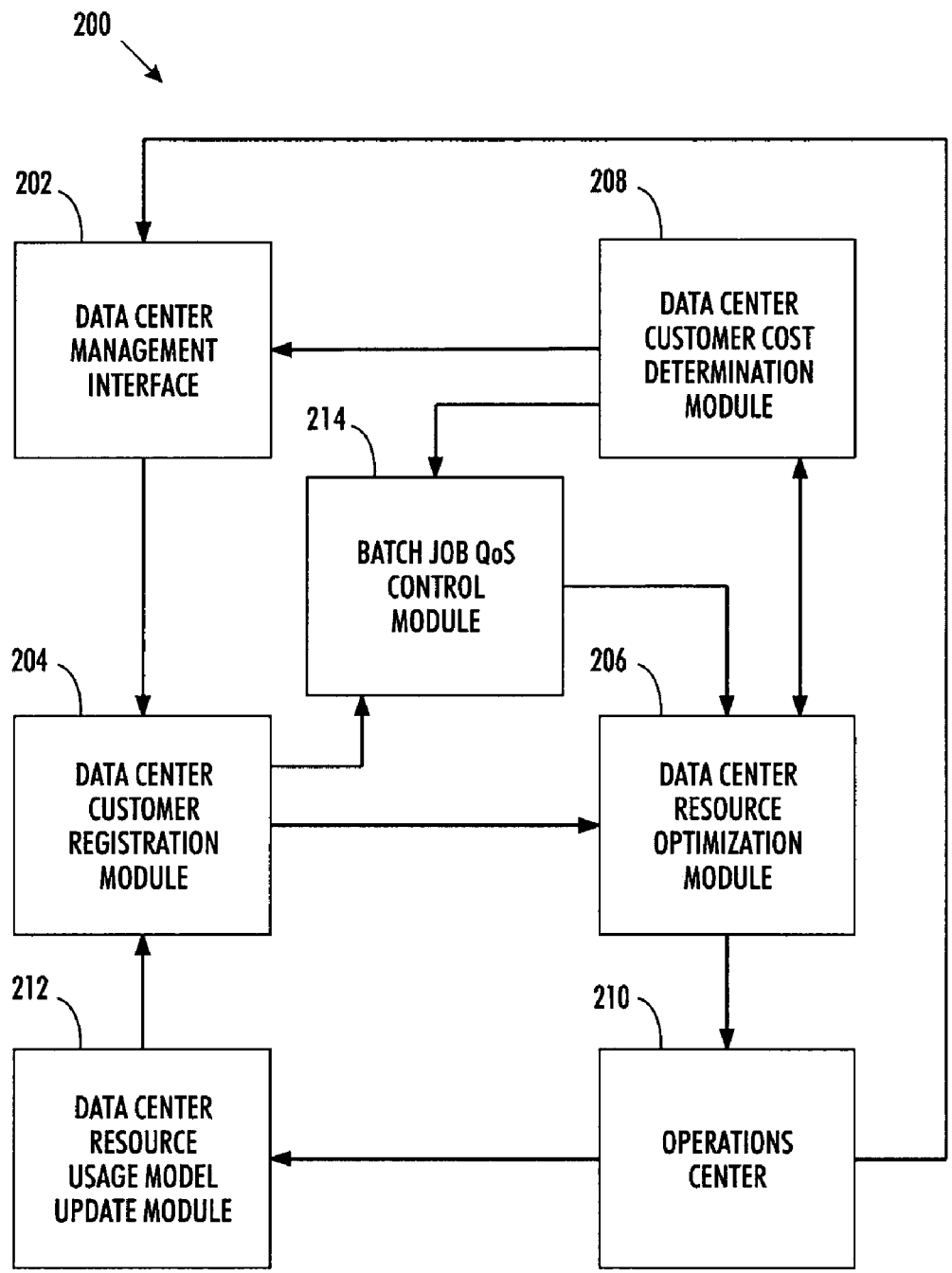
FIG. 2 illustrates an example of a data center optimization system having a data center management interface, a customer registration module, a batch job QoS control module, a resource optimization module, a customer cost determination module, an operations center, and a resource usage model update module.

FIG. 2 illustrates an example of a data center optimization system 200 in accordance with embodiments of the disclosed technology. In the example, the data center optimization system 200 includes a data center management interface 202, a data center customer registration module 204, a data center resource optimization module 206, and a data center customer cost determination module 208. The data center optimization system 200 also includes an operations center 210 such as a group of physical devices, for example, and a data center resource usage model update module 212. In the example, the data center optimization system 200 also includes a batch job QoS control module 214.

In the example, the data center customer registration module 204 can be used to register each new data center customer by facilitating execution of a data center customer-specific service level agreement (SLA) with the data center and establishing a data center resource usage model for the customer. The data center resource usage model can include a quantification of the data center's resources requested by the customer. For example, the data center customer registration module 204 can query the data center customer as to how much of each particular data center resource such as memory, disk space, and CPU bandwidth the customer would like to request. The data center optimization system 200 can then create a data center customer profile for the customer and store both the SLA and the data center resource usage model for the customer as part of the data center customer profile.

In a shared resource system, such as the data center architecture 100 illustrated in FIG. 1, it is possible to serve multiple jobs with the same data center resources by carefully managing the use of the data center resources according to quality of service specifications. For example, techniques for statistically packing multiple jobs (or virtual machines) into a data center resource pool can be implemented where such techniques involve the use of quality of service specifications such as specifications that specify a tolerated risk that the jobs will not receive the resources they need, for example. Examples of these techniques are described in co-pending U.S. patent application Ser. No. 12/253,111, titled "STATISTICAL PACKING OF RESOURCE REQUIREMENTS IN DATA CENTERS," and filed on Oct. 16, 2008, which application is fully incorporated herein by reference. Such techniques can save considerable data center resources when jobs have a diversity of quality of service specifications. In particular, the more risk-tolerant jobs can share the data center resource reservations of the more risk-averse jobs that would otherwise be wasted as contingent reserve.

In the example, the data center resource optimization module 206 can determine an initial (e.g., optimal) data center resource allocation for a given customer based on the customer's SLA and data center resource usage model, for example, and then assign the data center resource allocation to the operations center 210 for execution. In determining the data center resource allocation, the data center resource optimization module 206 can interact with the data center customer cost determination module 208, which can determine (e.g., estimate) the cost to the data center of servicing such as providing resources such as memory and processing to the particular customer. In certain embodiments, the data center resource optimization module 206 can send a request to the data center customer cost determination module 208 for a determination of the data center customer cost for a particular data center customer or group of data center customers.

Once the customer cost determination module 208 determines a data center customer cost for the customer or group, the data center customer cost determination module 208 can provide the data center customer cost to the data center resource optimization module 206. The data center resource optimization module 206 can then generate the data center resource allocation based on the data center customer cost and assign the data center resource allocation to the operations center 210 for execution.

The data center resource usage model update module 212 can monitor the operations center 210. Based on the monitoring of the operations center 210, the data center resource usage model update module 212 can provide recommendations to the data center customer registration module 204. For example, the data center resource usage model update module 212 can recommend that the data center customer registration module 204 revise the data center customer profile for a particular customer given the customer's usage of the operations center 210 over a certain period of time. In alternative embodiments, the data center resource usage model update module 212 can either revise the data center customer profile directly or provide a newly created data center customer profile to replace the existing data center customer profile for the customer.

The batch quality of service (QoS) control module 214 can be used for batch jobs, which tend to have a rather unique attribute in that they tend to require completion by a specified time rather than a particular priority of scheduling and of service during execution. In situations that involve data center resource allocations for batch jobs, data center resource reservations can be made on each time slice but the requests can be relaxed considerably. That is, batch jobs are generally flexible jobs that have low quality requirements on a per-time-slice basis but expect that, by the end of the time slices, the jobs will be done with a high probability.

The batch job QoS control module 214 can implement the techniques described herein to effectively guarantee successful completion times for batch jobs by meeting stochastic resource requirement or deadline completion specifications, for example, while optimizing data center resources in a mix of higher-priority tasks. Such techniques can involve the integration of batch jobs in a QoS shared resource system such that they become short-term risk tolerant and, consequently, reduce the level of data center resources required by the batch jobs while, at the same time, enabling the batch jobs to meet long-term objectives, such as deadlines, with high QoS specifications.

Certain embodiments can include the implementation of a control algorithm for batch jobs that is based on QoS specifications. As used herein, a QoS specification can include a specification of the data center resources that are needed for the completion of a batch job and a component that allows for some uncertainty in the successful provisioning of the batch job. In some embodiments, the QoS specification does not specify the resources needed; rather, it specifies the allowed uncertainty for successful provisioning of all the batch job needs as it executes.

As used herein, a QoS specification is typically similar to an SLA and, in some embodiments, may be the same. Separate terminology is used, however, because an SLA is generally closer to the customer and may describe service in terms related to the customer's applications, whereas the QoS is generally closer to the data center resource optimization and may describe service in terms of one or more data center resources. In embodiments where a QoS specification is different from an SLA, there can be a step that includes deriving QoS specifications based in part on SLAs. For a batch control operation, the terms "immediate" and "extended interval" QoS specifications as used herein can also be distinguished from each other.

The control algorithm can be used to drive a manipulation of "immediate" QoS specifications that are provided frequently to a statistical packing algorithm in order to achieve "extended interval" QoS specifications that are more natural for batch jobs. In certain embodiments, data center customer cost feedback from the implementation of the statistical packing algorithm can provide a linking of the two optimization algorithms, as illustrated in FIG. 2 (i.e., the batch job QoS control module 214 receives feedback from the data center customer cost determination module 208).

Figure 3:
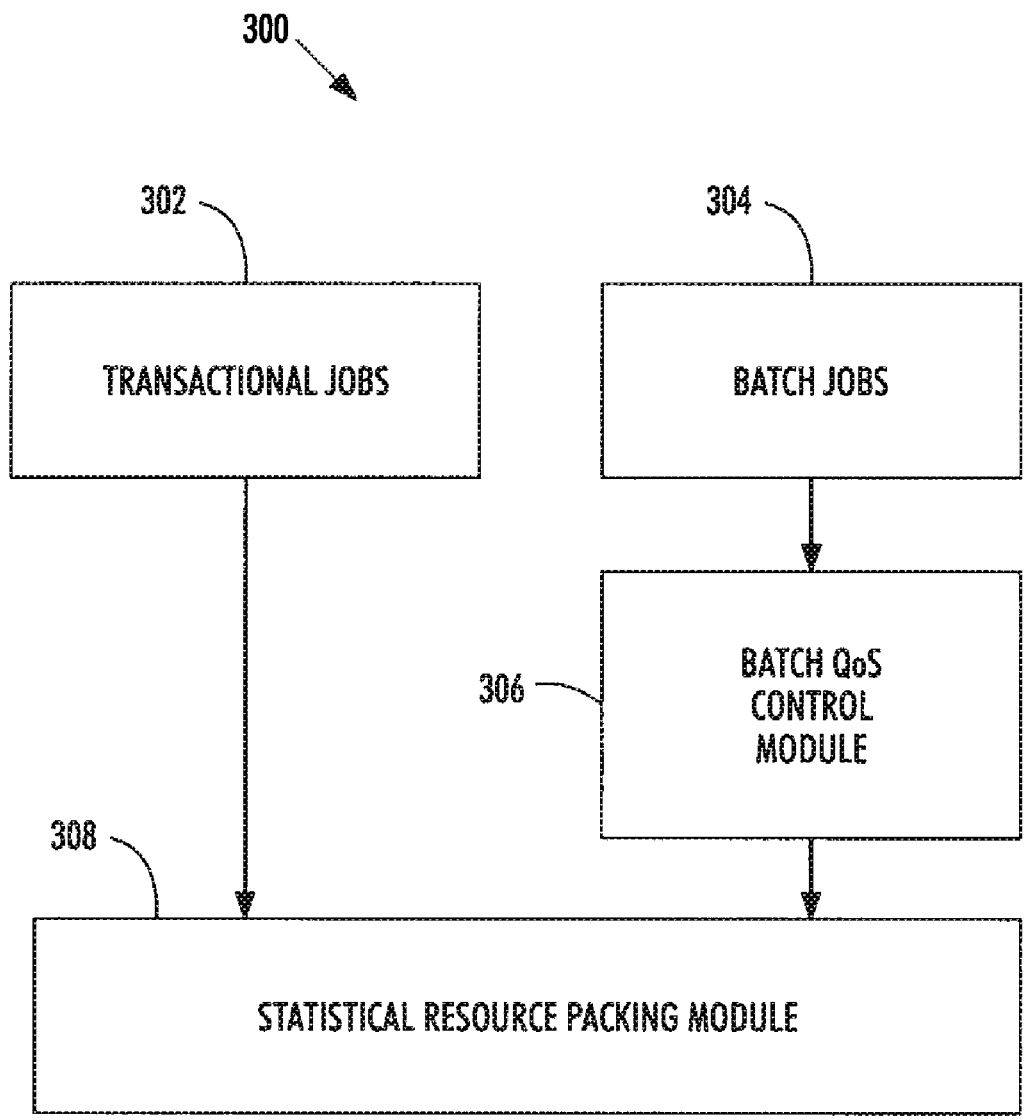
FIG. 3 illustrates an example of a sub-system of a data center optimization system, such as the data center optimization system of FIG. 2, that is suitable for use with transactional jobs and batch jobs, both of which are handled by a statistical resource packing module.

Embodiments of the disclosed technology effectively introduce a layer into the data center architecture that separates the batch job QoS concerns from the data center resource optimization components (e.g., implementations of the statistical packing algorithm), as illustrated in FIG. 3, which shows an example of a sub-system 300 of a data center optimization system (such as the data center optimization system 200 of FIG. 2) that is suitable for use with transactional jobs 302 as well as with batch jobs 304, both of which are handled by a statistical resource packing module 308. The batch jobs 304, however, are first handled by a batch job QoS control algorithm as implemented by a batch job QoS control module 306.

In certain embodiments, the batch job QoS control algorithm can take a batch job's "extended interval" QoS specification, along with the job's resource model for the extended interval, and adaptively produce a series of "immediate" QoS specifications for the batch job to be applied to individual time slices. These "immediate" QoS specifications will typically be far more flexible than the "extended interval" QoS and will thus facilitate effective statistical packing. The layer introduced into the architecture of the system advantageously frees the statistical packing algorithm from needing to directly optimize the "extended interval" QoS specifications; rather, there is now a higher level layer of control that translates these "extended interval" QoS specifications into "immediate" QoS specifications, which significantly simplifies the input to [and operation of] the implementation of the statistical packing algorithm.

Figure 4:
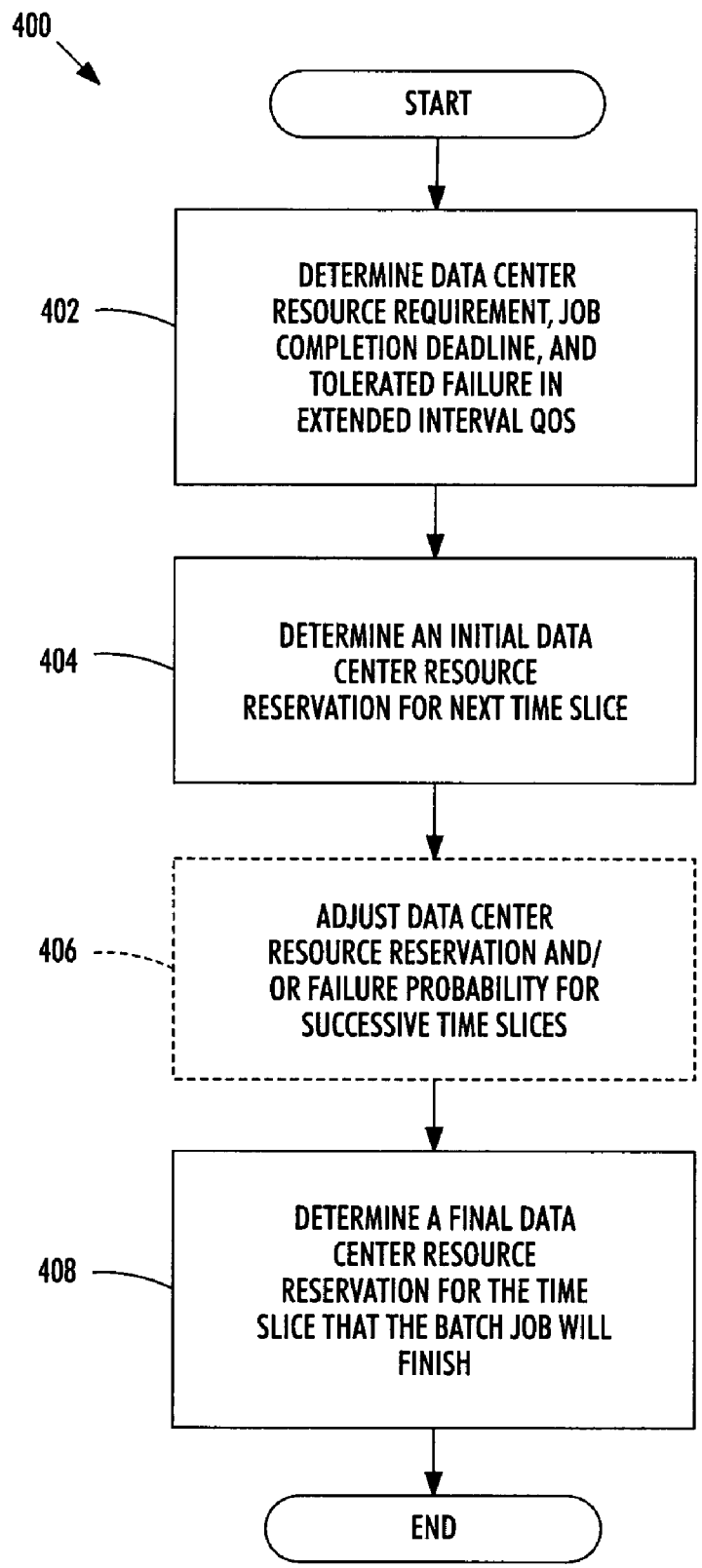
FIG. 4 is a flowchart illustrating an example of a method involving the implementation of a batch job QoS control algorithm via a batch QoS control module, for example, in accordance with embodiments of the disclosed technology.

FIG. 4 is a flowchart illustrating an example of a method 400 involving the implementation of a batch job QoS control algorithm via a batch job QoS control module, for example, in accordance with embodiments of the disclosed technology. In the example, a shared data center resource system reserves data center resources in time slices (e.g., every 3 minutes) and serves both transactional jobs and batch jobs where each job has an immediate QoS specification that can include a tolerated failure probability p that the job will not be provided the data center resources it needs within the time slice. An implementation of a statistical packing algorithm such as that described above, for example, can advantageously combine these immediate QoS specifications, which contain probabilities and models of the job's data center resource needs in order to arrive at a reduced data center resource requirement for a group of jobs.

While specifying the probability p of tolerated under provisioning per time slice, for example, may be a natural QoS concern for transactional jobs, it does not directly relate to batch jobs, which may be more concerned about completion at the end than a longer time period. For such jobs, the disclosed technology can involve an assumption that there is a different kind of QoS specification for these batch jobs, which can be referred to as an "extended interval" QoS. In one exemplary embodiment, an extended interval QoS specification can include a tolerated failure probability q that the job will not be completed by the end of a time interval after n time slices, for example.

At 402, the implementation of the batch job QoS control algorithm (e.g., as implemented by the batch job QoS control module 214 of FIG. 2 or the batch job QoS control module 306 of FIG. 3) first involves a determination that the total data center resource needs (e.g., data center resource demand) of a given batch job is known in advance to be T, that the batch job deadline (e.g., for batch job completion) is in n time slices, and that the tolerated failure in the extended interval QoS is q.

For purposes of illustration, one can consider T as representing the total computation resource needed by the batch job. One having ordinary skill in the art will understand that T can also represent other resource needs such as disk bandwidth or network bandwidth, or that it can be a vector of several resource types that are all required by the batch job.

At 404, the implementation of the batch job QoS control algorithm can determine an initial data center resource reservation S for the next time slice to be submitted in an immediate interval QoS along with p, which is an input parameter chosen to be much larger than q in order to facilitate the packing, for example. In the example, the batch job QoS control module can then determine a data center resource reservation S for each time slice by finding the smallest number of failures m such that the probability of m or fewer failures is greater than or equal to the required success rate (1−q), in accordance with the following:

$$\sum_{i=0}^{m} \binom{n}{i} p^i (1-p)^{n-i} \geq 1 - q$$

At 408, the implementation of the batch job QoS control algorithm can determine a final data center resource allocation S for the time slice such that the batch job will finish even with m failures in accordance with the following:

$$S = \frac{T}{n-m}$$

Thus, in the example, the implementation of the batch job QoS control algorithm can repeat the determination of the data center resource reservation S for every time slice based on a new value of the remaining resource requirement T that reflects whatever progress has been made in the preceding time slices. At 408, the batch job QoS control module can optionally adjust the data center resource reservation S based on the progress of the batch job. For example, if the batch job accumulates multiple failures to get data center resources during certain time slices, the batch job QoS control module can increase the data center resource reservation S in order to ensure completion of the batch job (e.g., in compliance with the job deadline). Alternatively, in situations where the batch job is making progress over each time slice, the batch job QoS control module can decrease the data center resource reservation S.

Such closed loop control of S can be thought of as conservative in several respects. First, when an immediate QoS fails in a particular time slice, the batch job QoS control module has planned assuming that no progress is being made on T, when in practice there will often be immediate QoS failures that involve partial data center resources being provided to the batch job. Second, by dynamically revising S, the batch job QoS control module may decrease the actual probability of failure below the probability as predicted by the formulas discussed above, which are generally accurate for an open loop execution with a single computation of S.

Exemplary Embodiments Involving an Uncertain T

The embodiments discussed above involved an assumption that T was known in advance of the operation of the QoS control module. In general, however, implementations of the disclosed technology include a stochastic model for T. Thus, the batch job QoS control algorithm can be expanded to achieve the "extended interval" QoS even when there is uncertainty in T. For example, if a distribution of possible values of T can be determined, the system can determine what S would be in light of the distribution.

Exemplary Embodiments Involving Feedback on T

In certain embodiments, it may be possible to instrument a batch job to provide dynamic estimates of its progress from which estimates of the remaining T may be computed, or the instrumentation can provide direct estimates of the remaining T as the batch job executes. In such embodiments, the information can thus be included in a dynamic computation of S.

Exemplary Embodiments Involving More Precise Calculations of S

In the embodiments discussed above, the QoS control planning generally assumes [conservatively] that S would remain constant for the remaining time slices, even though the computation of S would be repeated each time slice. However, even better performance can be achieved if the planning for S accounts for future closed loop adjustments to S. One having ordinary skill in the art will appreciate that the closed loop equivalent to the probability of failure is not necessarily of a closed form; rather, it can be computed via dynamic programming. This can advantageously enable implementations of a batch job QoS control algorithm to be slightly less conservative (e.g., knowing that S will be readjusted based on information pertaining to previous results), and thereby conserve even more data center resources.

Exemplary Embodiments Involving Manipulations of Both S and p

In the embodiments discussed above, the immediate QoS specification included a fixed p and made dynamic adjustments to S to ensure that a batch job would be completed according to its extended interval QoS. Alternative embodiments can include a varying p in the immediate QoS. For example, the system can allocate more S (i.e., ask for a larger S) in each time slice while allowing a larger p (i.e., tolerated failure). Such implementations can thus be used to generate a parameterized family of solutions (p, S) for the immediate QoS specification. This can be beneficial in several respects.

For example, as a batch job nears the end of its extended interval, a batch job QoS control module can increase S to ensure that the job finishes. If there is an upper limit on the amount of data center resources available (or usable) in a certain time slice, then the parameterized family of solutions can facilitate decreasing p to limit the size of S required to ensure that the job finishes. Also, if a statistical packing module provides a costing on (p, S), then the batch job QoS control module can optimize the choice of (p, S) within the parameterized family of solutions. Such a "price signal" from the statistical packing module to the QoS batch control module can advantageously allow the two modules to achieve good joint optimization without needing to solve a more complex, combined optimization problem.

Figure 5:
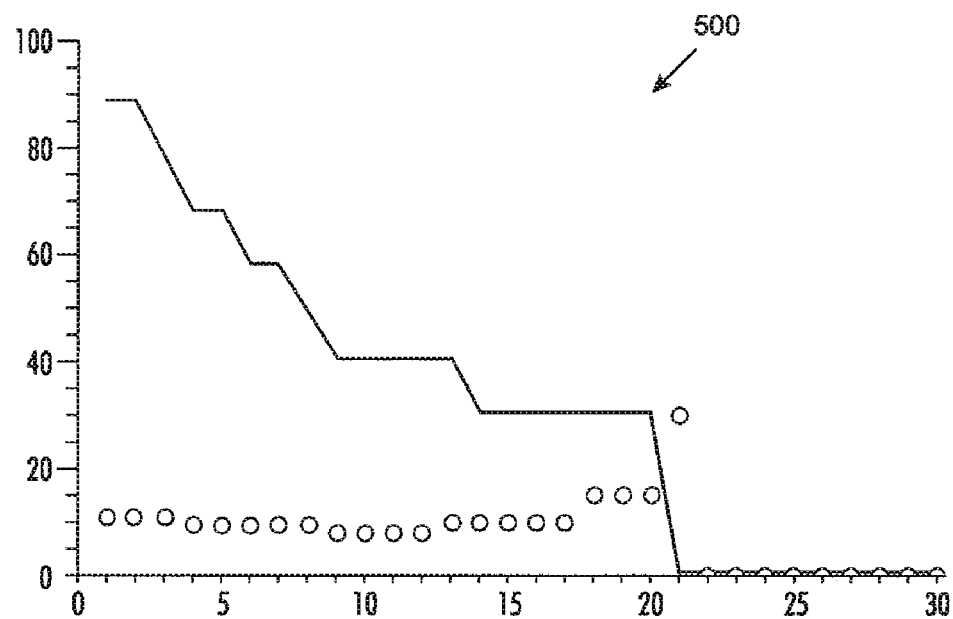
FIG. 5 is a graph illustrating a first example of adjusting a data center resource reservation S for a batch job over a period of 30 time slices in accordance with embodiments of the disclosed technology.

FIG. 5 is a graph 500 illustrating a first example of adjusting a data center resource reservation S for a batch job over a period of 30 time slices in accordance with embodiments of the disclosed technology. In the example, each dot represents a data center resource allocation S for a batch job for the corresponding time slice (i.e., along the x-axis). The solid line represents the progress of the batch job, where the data center resource needs at the first time slice is the total data center resource needs T. As the batch job progresses, the data center resource allocation S is adjusted responsive to the progress being made by the batch job. In the example, the data center resource allocation S is notably increased around the $20^{th}$ time slice because the batch job is nearing its completion deadline while not making enough progress to meet the deadline without an adjustment of the data center resource allocation S.

Figure 6:
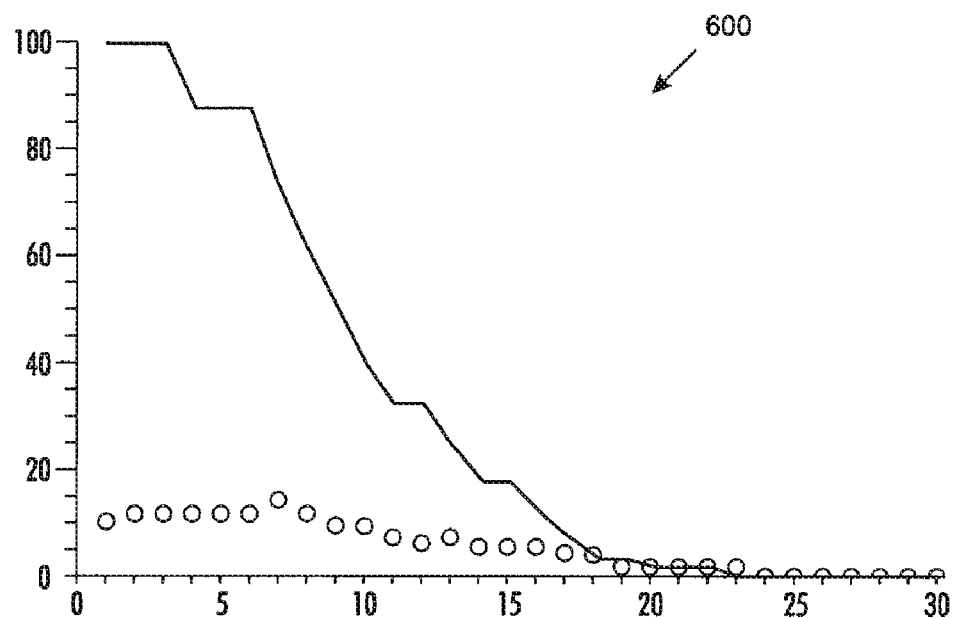
FIG. 6 is a graph illustrating a second example of adjusting a data center resource reservation S for a batch job over a period of 30 time slices in accordance with embodiments of the disclosed technology.

FIG. 6 is a graph 600 illustrating a second example of adjusting a data center resource reservation S for a batch job over a period of 30 time slices in accordance with embodiments of the disclosed technology. As with FIG. 5, each dot in the graph 600 of FIG. 6 represents a data center resource allocation S for a batch job for the corresponding time slice (i.e., along the x-axis). As the batch job progresses, the data center resource allocation S is adjusted responsive to the progress being made by the batch job. In the example, the data center resource allocation S is held fairly constant during the entire execution of the batch job as the batch job seems to be making significant progress, particularly between the $5^{th}$ and $10^{th}$ time slices.

Exemplary Machine in which Embodiments of the Disclosed Technology May be Implemented The following discussion is intended to provide a brief, general description of a suitable machine in which certain embodiments of the disclosed technology can be implemented. As used herein, the term "machine" is intended to broadly encompass a single machine or a system of communicatively coupled machines or devices operating together. Exemplary machines can include computing devices such as personal computers, workstations, servers, portable computers, handheld devices, tablet devices, and the like.

Typically, a machine includes a system bus to which processors, memory (e.g., random access memory (RAM), read-only memory (ROM), and other state-preserving medium), storage devices, a video interface, and input/output interface ports can be attached. The machine can also include embedded controllers such as programmable or non-programmable logic devices or arrays, Application Specific Integrated Circuits, embedded computers, smart cards, and the like. The machine can be controlled, at least in part, by input from conventional input devices (e.g., keyboards and mice), as well as by directives received from another machine, interaction with a virtual reality (VR) environment, biometric feedback, or other input signal.

The machine can utilize one or more connections to one or more remote machines, such as through a network interface, modem, or other communicative coupling. Machines can be interconnected by way of a physical and/or logical network, such as an intranet, the Internet, local area networks, wide area networks, etc. One having ordinary skill in the art will appreciate that network communication can utilize various wired and/or wireless short range or long range carriers and protocols, including radio frequency (RF), satellite, microwave, Institute of Electrical and Electronics Engineers (IEEE) 545.11, Bluetooth, optical, infrared, cable, laser, etc.

Embodiments of the disclosed technology can be described by reference to or in conjunction with associated data including functions, procedures, data structures, application programs, instructions, etc. that, when accessed by a machine, can result in the machine performing tasks or defining abstract data types or low-level hardware contexts. Associated data can be stored in, for example, volatile and/or non-volatile memory (e.g., RAM and ROM) or in other storage devices and their associated storage media, which can include hard-drives, floppy-disks, optical storage, tapes, flash memory, memory sticks, digital video disks, biological storage, and other tangible, physical storage media.

Associated data can be delivered over transmission environments, including the physical and/or logical network, in the form of packets, serial data, parallel data, propagated signals, etc., and can be used in a compressed or encrypted format. Associated data can be used in a distributed environment, and stored locally and/or remotely for machine access.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. A machine-controlled method, comprising:
a processor determining an extended interval quality of service (QoS) specification for a given batch job, wherein determining the extended interval QoS specification comprises determining an allowed probability of failure q that the batch job will not be completed by the end of a time interval of n time slices;
for at least a first time slice of the n time slices, the processor determining a remaining data center resource requirement T for the batch job based at least in part on the extended interval QoS specification;
the processor determining an immediate QoS specification for the batch job, comprising:
determining a failure tolerance p for at least the first time slice; and
determining a smallest number of failures m such that a probability of m or fewer failures is greater than or equal to a required success rate (1−q);
determining a data center resource reservation S for the first time slice based on T, n and m; and
adjusting the data center resource reservation S, the failure tolerance p, or both, based at least in part on a progress of the batch job at the first time slice and the allowed probability of failure q.

2. The machine-controlled method of claim 1, further comprising, for at least a second time slice of the n time slices, the processor determining the immediate QoS specification based at least in part on the progress of the batch job, wherein the second time slice occurs after the first time slice and before a completion time of the batch job.

3. The machine-controlled method of claim 1, wherein determining the remaining data center resource requirement T comprises determining a stochastic model of data center resources needed to complete the batch job.

4. The machine-controlled method of claim 1, wherein determining the immediate QoS specification comprises increasing the data center resource reservation S responsive to a determination that a progress of the batch job is slower than a predetermined amount.

5. The machine-controlled method of claim 1, wherein determining an immediate QoS specification comprises decreasing the data center resource reservation S responsive to a determination that a progress of the batch job is faster than a predetermined amount.

6. The machine-controlled method of claim 1, further comprising the processor adjusting the failure tolerance p for at least a second time slice of the n time slices based on the progress of the batch job, wherein the second time slice occurs after the first time slice and before a completion time of the batch job.

7. The machine-controlled method of claim 6, wherein adjusting the failure tolerance p comprises decreasing the failure tolerance p responsive to a determination that the progress of the batch job is slower than a predetermined amount.

8. The machine-controlled method of claim 6, wherein adjusting the failure tolerance p comprises increasing the failure tolerance p responsive to a determination that the progress of the batch job is faster than a predetermined amount.

9. The machine-controlled method of claim 1, wherein determining the remaining data center resource requirement comprises estimating an amount of data center resources needed to complete the batch job based at least in part on registration information for a data center customer.

10. The machine-controlled method of claim 1, further comprising the processor adjusting the data center resource reservation S and the failure tolerance p for at least a second time slice of the n time slices based on a progress of the batch job, wherein the second time slice occurs after the first time slice and before a completion time of the batch job.

11. A machine-controlled method, comprising:
 a processor determining an extended interval quality of service (QoS) specification for a data center batch job, wherein determining the extended interval QoS specification comprises determining an allowed probability of failure q that the batch job will not be completed by the end of a time interval of n time slices;
 for an immediate time slice, the processor determining a remaining data center resource requirement T for the data center batch job based at least in part on the extended interval QoS specification; and
 the processor determining an immediate QoS specification for the data center batch job, comprising:
  determining a failure tolerance p for the immediate time slice; and
  determining a smallest number of failures m such that a probability of m or fewer failures is greater than or equal to a required success rate (1−q);
 determining a data center resource reservation S for the immediate time slice based on T, n and m; and
 adjusting at least one of the data center resource reservation S and the failure tolerance p based at least in part on a progress of the batch job at the immediate time slice and the allowed probability of failure q.

* * * * *